United States Patent Office 3,156,366
Patented Nov. 10, 1964

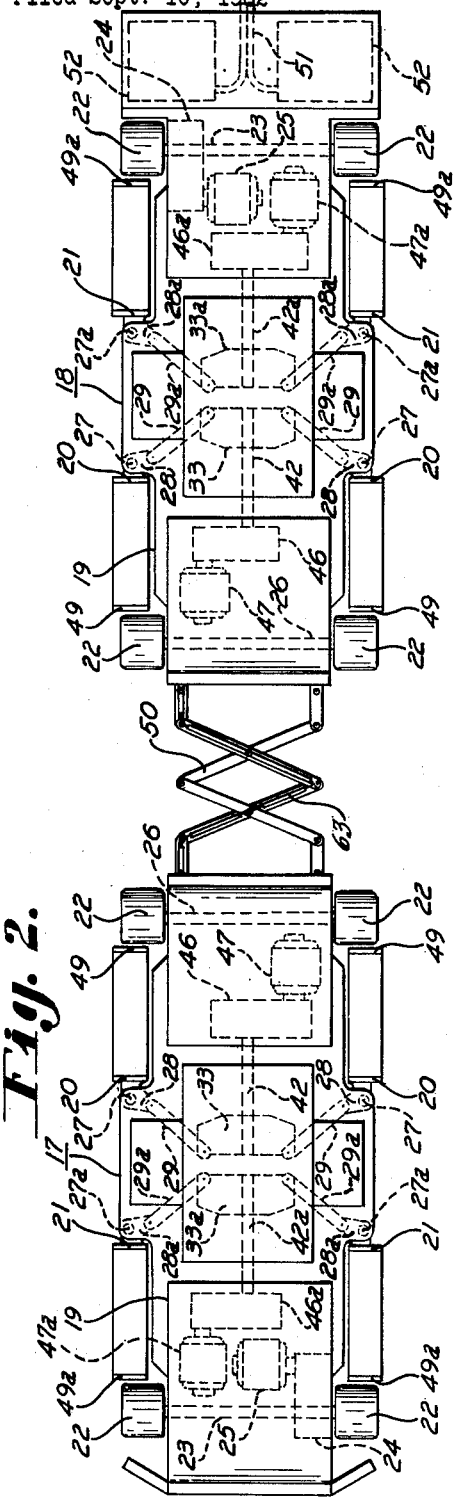
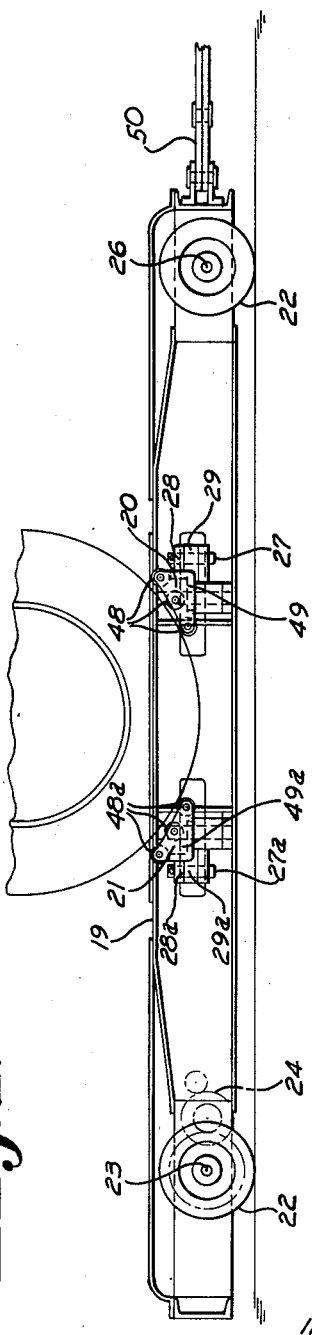
Fig. 2.
Fig. 5.
INVENTOR
MILO SHUTT

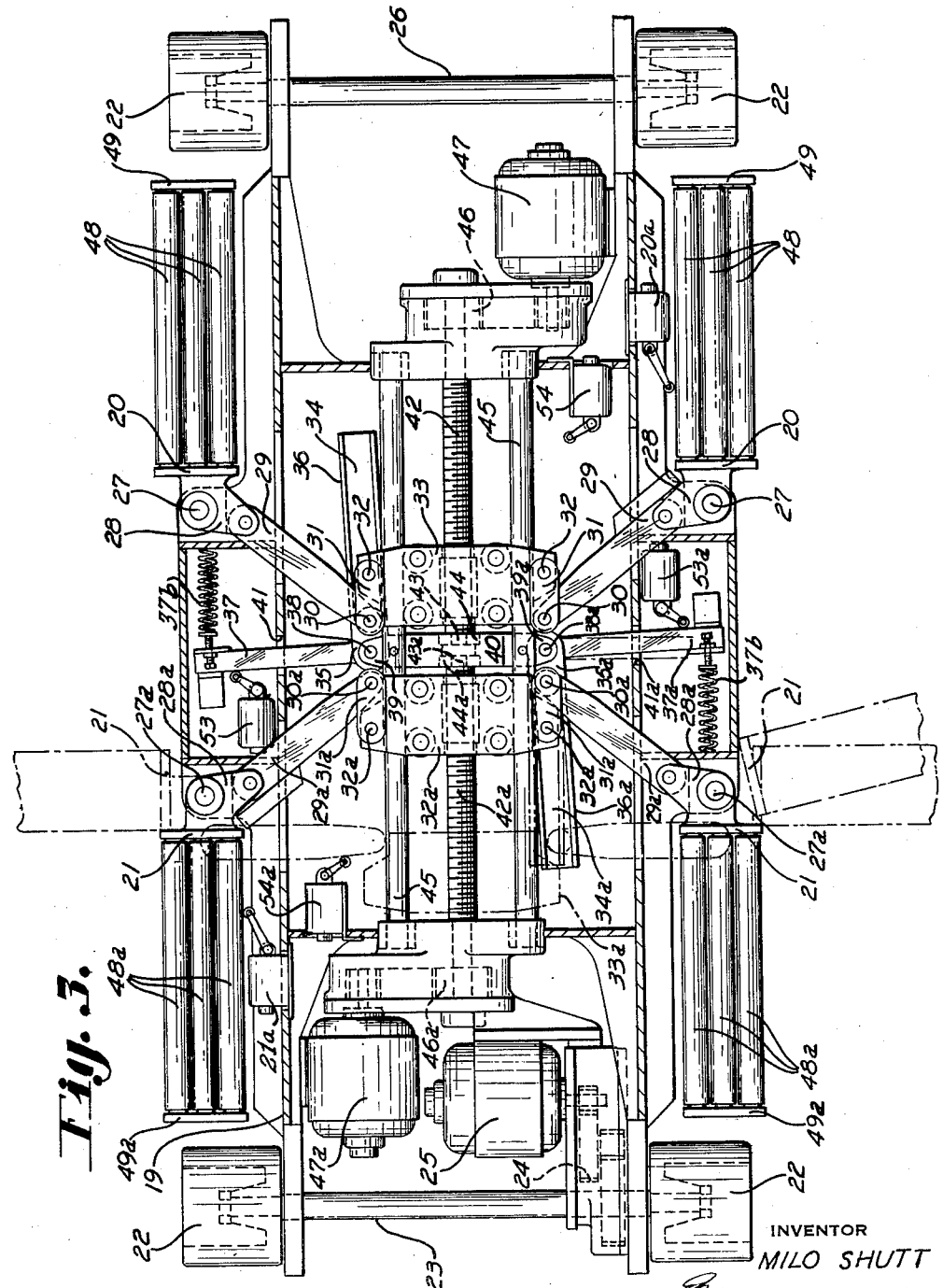

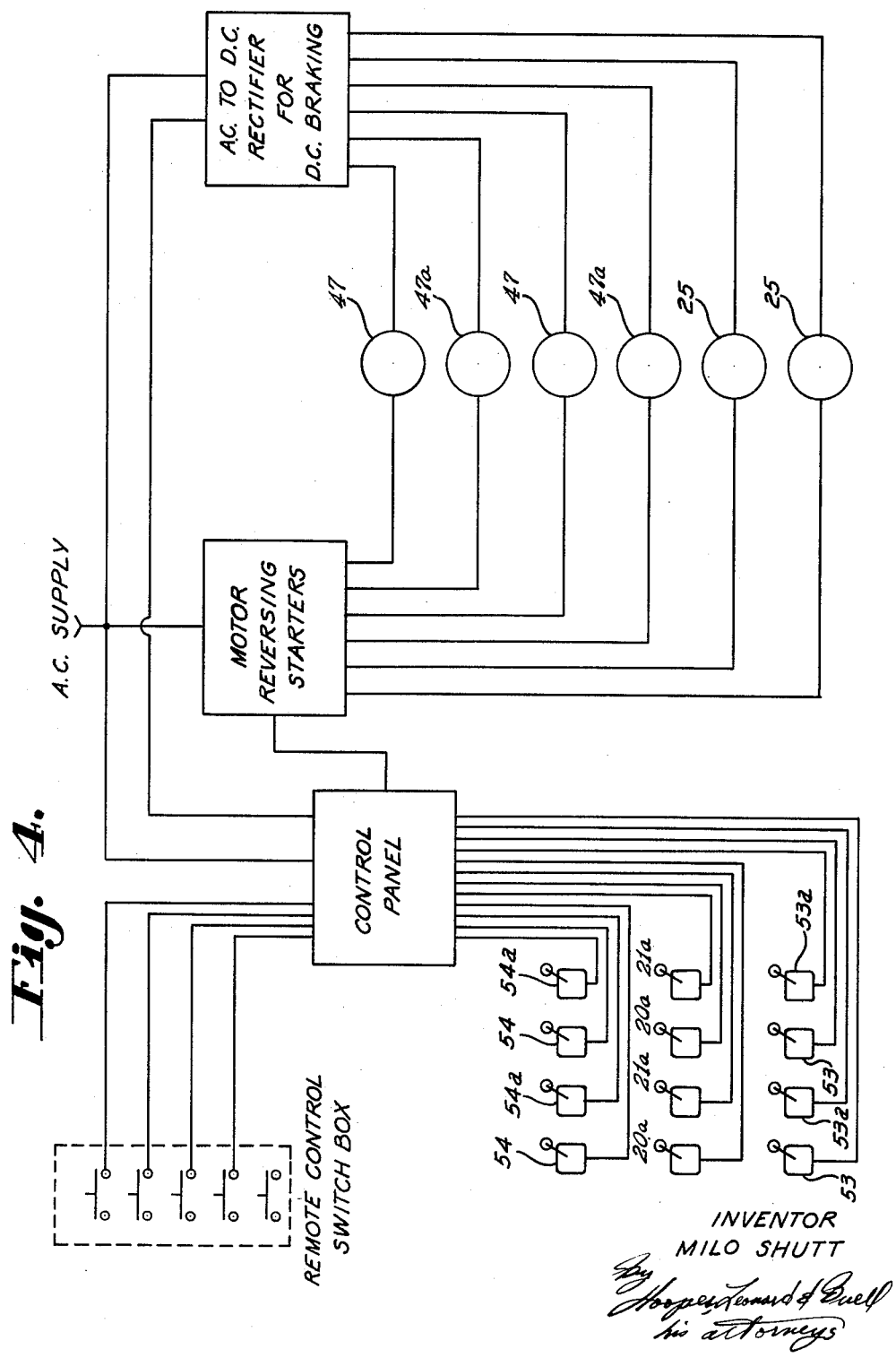

3,156,366
PARKING AND HANDLING DEVICES
Milo Shutt, Alliance, Ohio, assignor to The Alliance
Machine Company, Alliance, Ohio
Filed Sept. 10, 1962, Ser. No. 222,459
5 Claims. (Cl. 214—16.1)

The present invention relates to parking and handling devices and particularly to an automatic parking and handling dolly for automotive vehicles. The problem of parking and discharging automobiles in offstreet parking areas has become increasingly significant with the growth of suburban areas and the increased use of automobiles for commuting traffic. In the past, the vast majority of the parking areas established for offstreet parking have been based upon the principle of driving the vehicle from the entrance to a parking area situated within a parking garage. This is true even where multi-level parking garages are provided and even where an elevator is used to move the vehicles from one level to another. Such parking facilities are wasteful of space and do not make the maximum use of the expensive land area involved. This is particularly true since such facilities are usually needed and usually placed in downtown areas where land values are at a premium. Various types of parking garages using automatic vehicle storage devices have been proposed in an effort to obtain the maximum use of storage facilities. Such devices have, however, not proven to be completely satisfactory, partly because of the complexity of the drive mechanisms which make up the charging and discharging apparatus.

I have invented a parking and handling device which is capable of handling all sizes of automotive vehicles and which lifts the vehicles by all four wheels, thus avoiding and chance of damage to the oil pan or transmission or other vital parts of the automobile under carriage. The apparatus of my invention is automatically selective as to length so that any vehicle, regardless of its wheel base, may be quickly and efficiently handled.

In the present invention, I provide a parking apparatus including a multi-level structure with generally side by side storage stalls at each level, elevator means tranversable transversely of the ends of the stalls, cooperating ways on the elevator and in each stall, a dolly having a pair of separately movable carriages connected together and movable on the cooperating ways, extendable means connecting said carriages to permit variable spacing therebetween, wheel engaging means on each carriage movable from a position parallel to the sides of the carriage and to the plane of the wheels of the vehicle to be lifted to a position transverse to the sides of the carriage and to the plane of the vehicle wheels, said horizontally movable wheel engaging means being spaced so as to engage opposite sides of each wheel and cause the wheels to run up onto the arms, drive means on each carriage independently moving the carriages, a second drive means on each carriage moving the wheel engaging means from one position to another and control means for selectively actuating the carriage drive means and the wheel engaging member drive means to place the carriages beneath the vehicle and engage the wheel engaging means onto the vehicle wheels.

Preferably, the wheel engaging means are paired horizontally movable arms pivoted on each side of each carriage and movable in an arc from a position generally parallel to the carriage to a position transverse to the sides of the carriage. The arms are provided with inclined surfaces, preferably multiple rollers, engaging the wheels to cause the wheels to ride up on the inclined surfaces as the arms are moved to the transverse position.

Preferably, these arms are actuated by means of a screw driven by separate electric actuating motors and the carriages are separately driven by electric drive motors acting through wheels supporting the carriages. The several drive motors are preferably sequentially actuated so that one carriage is moved into position and the wheels engaged by the wheel engaging members on that one carriage after which the second carriage engages the second set of wheels to lift the vehicle whereupon both carriages are driven to move the vehicle on the ways of the elevator and the ways of the stall so as to selectively place the vehicle in the parking carriage.

In the foregoing general statement, I have set out certain advantages, objects and purposes of the present invention. Other purposes, objects and advantages will be apparent from a consideration of the following description and the accompanying drawings in which:

FIGURE 2 is a top plan view of a dolly structure according to the present invention;

FIGURE 3 is an enlarged top plan view of a single carriage partly in section as used in the dolly of FIGURE 2;

FIGURE 4 is a schematic wiring diagram for the dolly of FIGURE 2; and

FIGURE 5 is a side elevation of the dolly of FIGURE 2.

Figure 1:
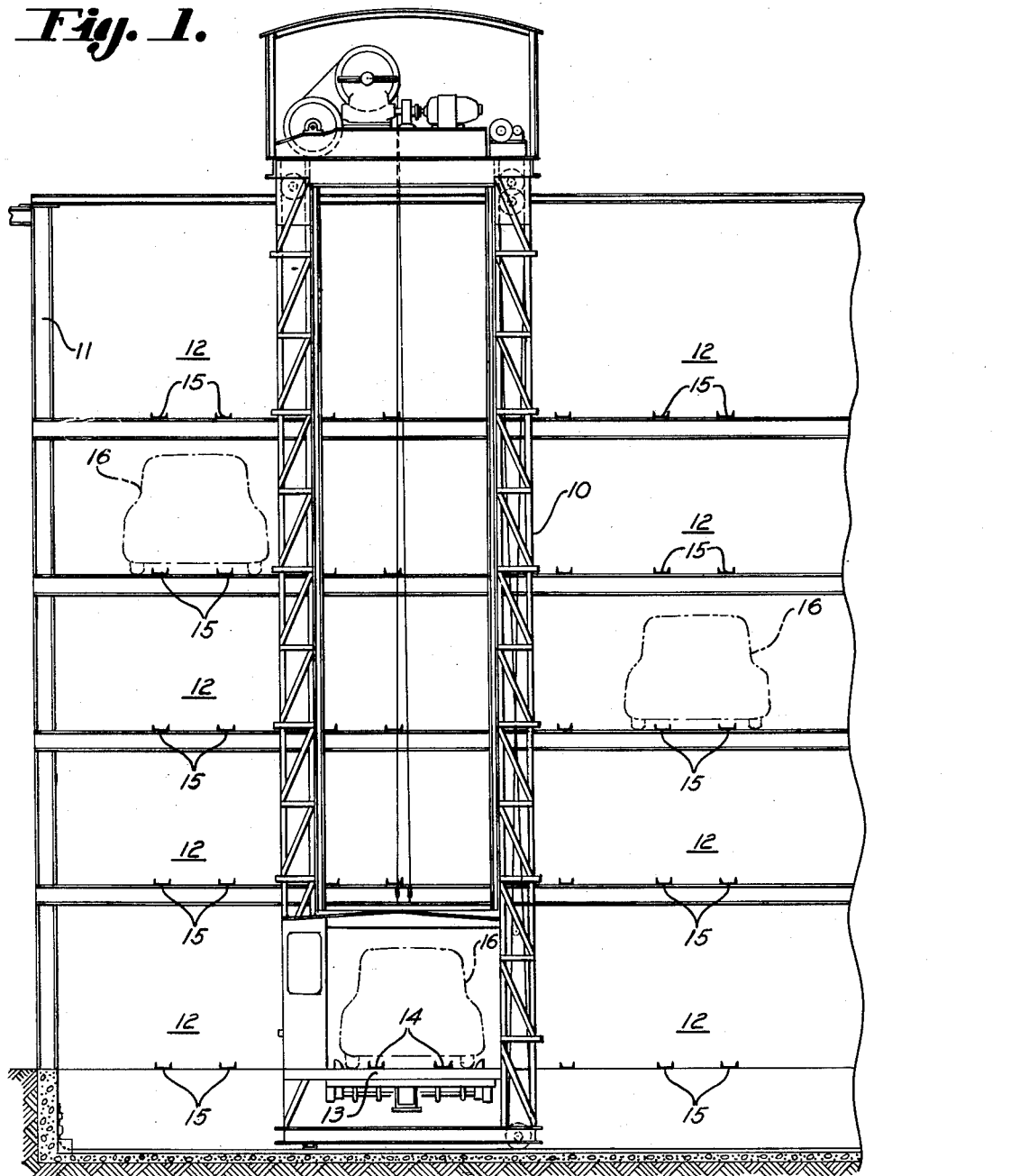
FIGURE 1 is an end elevation of an elevator tower and tiered storage garage structure incorporating the invention.

Referring to the drawings, I have illustrated diagrammatically in FIGURE 1 an elevator tower 10 movable transversely of a tiered multi-storage structure 11 with separate storage stalls 12 opening to the elevator. The elevator tower 10 is provided with a vertically moving platform 13 of conventional design which may be operated vertically by any of conventional methods. All of the foregoing may follow well known and conventional structures.

The elevator platform 13 is provided with guideways 14. Each stall 12 and the entrance stall is provided with similar and cooperating guideways 15 which align with the guideways 14 on the elevator when the platform is brought in front of the stall 12 or the entrance stall for the placement of an automative vehicle 16 therein.

An automobile handling dolly made up of separate carriages 17 and 18 is provided for operation on the runways. Each of the carriages 17 and 18 is provided with an outer frame 19 of generally rectangular shape. The frame 19 has two pairs of lift arms 20 and 21 hinged to the sides, with the two arms 20 and 21 on each side of the frame being spaced apart and hinged to rotate in opposite directions from a position generally parallel to the sides of the frame 19 (see FIGURE 3) to a position generally normal to the sides of the frame, as shown in chain line on FIGURE 3. The carriage is provided with supporting wheels 22 adapted to run in the guideways 14 and 15. One pair of these wheels is keyed to the axle 23 and driven through spur gears 24 and drive motor 25. The other pair of wheels is free to rotate on their shaft 26.

The pair of lift arms 20 are pivoted on stub shafts 27 on the side of the frame and are in the form of a bell crank having a driving arm 28. The driving arm 28 is pivoted at its end on one end of a link 29. The opposite end of the link 29 is pivoted on a pivot pin 30 on a short link 31, which is in turn pivoted on a pin 32 on yoke 33. On one arm of each pair the pin 30 extends through the lever 31 into a guide slot 34 in a bell crank 35 having a guide member 36 which is pivoted at its junction with transverse rod 37 on a pin 38 on a yoke 39 which extends from center member 40. The transverse rod 37 passes through openings 41 on each side of the guide frame 19 and is biased by spring 37b. The yoke 33 is threaded on a screw 42 which is journaled at one end 43 in a bearing member 44 mounted on the stationary center member 40 fixed to support rods 45 extending longitudinally on the guide frame. The screw 42 is driven through spur gears 46 by an electric motor 47. The lift arms 21 are provided with a mirror image of the operating mechanism for arms 20 and the elements are identified with like numbers bearing the suffix "a." The arms 20 and 21 are preferably provided with two or more rollers 48 inclined upwardly from the leading edge 49 of the arms. The two carriages 17 and 18 are connected by scissors frame 50 so as to permit relative movement of the two carriages. Electrical power is delivered to one of the carriages through a retractable cable 51 which goes to control boxes 52 on the carriage. The other carriage is connected by means of a cable 63 from the control box 52 along one series of the scissors frame 50.

The operation of the dolly of this invention is as follows:

An automotive vehicle to be transferred is driven over the entrance guideways. The elevator is moved so that the guideways 14 on the platform are in alignment with the entrance guideways. One of the drive motors 25 is energized through cable 51 from a remote control switch box by the building operator. The electrical energy enters the carriage through the cable 51 and, assuming that the vehicle to be picked up is to the left of FIGURE 2, motor 25 on carriage 18 is energized to move carriage 18 to the left. This compresses the scissors frame until carriage 18 contacts carriage 17 which is then pushed along with carriage 18 through between the wheels of the vehicle. At the same time motor 25 is energized, motor 47a on carriage 18 is energized to open arms 21. The arms 21 swing about the pivot pins 27a until the arms 21 are at a position indicated by the dash and single dot lines on FIGURE 3. At this point, the arms 21 are at an angle greater than 90° from their original position. The motor 25 drives the arms 21 against the first set of vehicle wheels. This snaps the arms 21 back to the dash and double dot line position of FIGURE 3 which moves the guide member 36a from the full line position of FIGURE 3 to the dash and double dot line position by rotation bell crank 35a about the pivot pin 38a and in turn moves the transverse rod 37a from the full line position to the dashed line position. This movement of rod 37a actuates the limit switch 53a which in turn de-energizes travel motor 25 and lift motor 47a and energizes lift motor 47 its mirror image on the same carriage and motor 47 on carriage 17. Motor 47 moves arms 20 of carriage 18 into cotnact with the vehicle wheels causing them to ride up on the rollers 48 of the arms. Motor 47 on carriage 17 moves the arms 20 on carriage 17 to a position greater than 90° from the position of original start identical with the starting position of arms 21 on carriage 18. As soon as the arms 20 of carriage 18 have closed and lifted the vehicle wheels, limit switch 54 energizes the motor 25 on carriage 17 moving it away from carriage 18 until arms 20 contact the second set of wheels on the vehicle. The cycle described in connection with carriage 18 is repeated bringing arms 20 and 21 beneath the second set of wheels, thus lifting all four wheels of the vehicle off of the guideways 14. When the limit switch 54a of carriage 17 is actuated, all of the motors 47 and 47a cease to operate. The operator energizes one or both of the drive motors 25 and the carriages 17 and 18 carry the vehicle on the guideways onto the platform 13. The elevator is then moved to a stall where the vehicle is to be deposited. The motors 25 are energized to move the carriages into the stall carrying the vehicle. Motors 25 are stopped and motors 47 and 47a for the arms 20 and 21 are energized returing the arms back against the sides of the frame of the carriages 17 and 18, depositing the vehicle in the sealed stall. Limit switches 20a and 21a contacted by arms 20 and 21 respectively open the motor circuits for motors 47 and 47a respcetively when the arms 20 and 21 reach the sides of the frame. One or both the carriage motors 25 are then reversed to bring the carriages onto the guideways 14 on the platform 13 and the elevator returned for another vehicle. To remove a vehicle from a stall, this process is reversed.

While I have described a presently preferred embodiment of my invention, it will be understood that this invention may be otherwise embodied within the scope of the following claims.

I claim:

1. In a parking apparatus having generally side-by-side storage stalls, an elevator means traversable transversely of the ends of the stalls, cooperating ways on the elevator and in each stall, the improvement comprising a dolly having a pair of separately and independently moving carriages, said carriages being connected together by stop means limiting their independent movement, each of said carriages having driven wheels independently movable on the cooperating ways, drive means on each carriage independently driving the driven wheels on said carriage to move said carriage, first and second wheel engaging means on each said carriage each movable from a rest position parallel to the side of the carriage and the plane of the wheels of the vehicle to an actuating position greater than 90° from the rest position and to an operative position transversely to the side of the carriage and to the plane of the vehicle wheels, said first and second horizontal movable wheel engaging means on each carriage being so spaced as to engage opposite sides of a pair of vehicle wheels to force the wheels to run onto the movable wheel engaging means to lift the wheels of the vehicle from the surface on which they rest, a second drive means on each carriage moving the first wheel engaging means from their rest position to their actuating position and return, a third drive means on each carriage moving each of the second wheel engaging means from their rest position to engage the opposite side of the wheel when the first wheel engaging means are moved from their actuating position to their operating position by contact with the wheel to be lifted and control means selectively actuating one carriage drive means and one of said second and third drive means on said one carriage selectively to run the carriage beneath the vehicle and engage one of said first and second wheel engaging means on the vehicle tire to move it from its actuating position to its operative position and energizing means actuated by the movement of the wheel engaging means from the actuating to operative position to energize the other of said first and second wheel engaging means on said one carriage and to energize the drive in the other carriage to cause it to move toward the other pair of vehicle wheels and to open one of the first and second wheel engaging means thereon to its actuating position whereby the said other carriage goes through the same cycle to lift said other pair of wheels.

2. A parking apparatus as claimed in claim 1 wherein each of the wheel engaging means is provided with an inclined surface positioned so that the low side of the surface engages the vehicle wheel first to cause the wheel to run up said surface.

3. A parking apparatus as claimed in claim 2 wherein each of said inclined surfaces is provided with rollers engaging and supporting the wheel to be lifted.

4. A parking apparatus as claimed in claim 1 wherein the stop means connecting the carriages is a scissors tongs arrangement.

5. A parking apparatus as claimed in claim 1 wherein yoke means are provided on each pair of lifting members and movable longitudinally of the carriage to move the arms from one position to another and separate screw means threadingly engages each of said yoke means and are driven by the second and third drive means.

References Cited in the file of this patent

UNITED STATES PATENTS

| | | |
|---|---|---|
| 1,962,127 | Balkema et al. | June 12, 1934 |
| 2,117,274 | Buettell | May 17, 1938 |
| 2,846,186 | Smith | Aug. 5, 1958 |
| 2,899,087 | Jacobsen | Aug. 11, 1959 |
| 2,916,166 | Bigler | Dec. 8, 1959 |
| 3,038,621 | Mitchell | June 12, 1962 |

UNITED STATES PATENT OFFICE
CERTIFICATE OF CORRECTION

Patent No. 3,156,366                 November 10, 1964

Milo Shutt

It is hereby certified that error appears in the above numbered patent requiring correction and that the said Letters Patent should read as corrected below.

Column 1, line 35, for "and" read -- any --; column 2, line 48, for "automative" read -- automotive --; column 3, line 59, for "cotnact" read -- contact --; column 4, line 8, for "sealed" read -- selected --.

Signed and sealed this 13th day of April 1965.

(SEAL)
Attest:

ERNEST W. SWIDER
Attesting Officer

EDWARD J. BRENNER
Commissioner of Patents